2,048,993

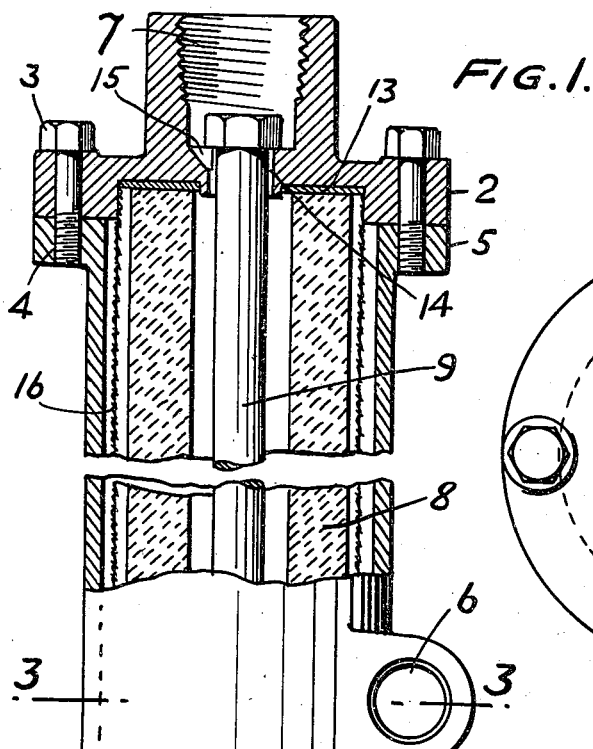
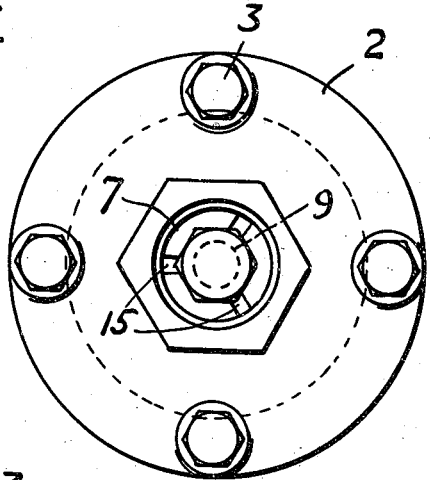
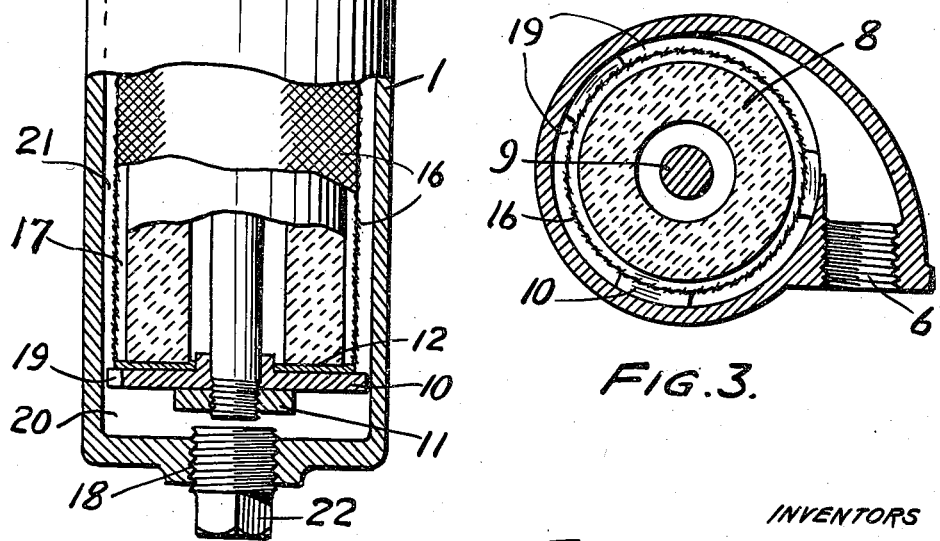
FIG.1.
FIG.2.
FIG.3.
July 28, 1936. J. B. CLAFFEY ET AL 2,048,993
GAS FILTER
Filed Nov. 16, 1934
INVENTORS
Joseph B. Claffey
Joseph A. Perry
BY Augustus B. Stoughton
ATTORNEY.
WITNESS:
Rob R. Kitchel Patented July 28, 1936

UNITED STATES PATENT OFFICE 2,048,993

GAS FILTER

Joseph B. Claffey, Philadelphia, and Joseph A. Perry, Swarthmore, Pa., assignors to The United Gas Improvement Company, Philadelphia, Pa., a corporation of Pennsylvania Application November 16, 1934, Serial No. 753,326

2 Claims. (Cl. 183—73)

The present invention relates to gas filters. The apparatus of the invention has been developed particularly for use in filtering very small particles of so-called "Vapor phase gum" from distributed manufactured gas, prior to consumption of the gas in such gas-burning appliances as gas ranges, water heaters, refrigerators, etc.

Manufactured gas such as, for instance, coal or coke oven gas, carburetted water gas and oil gas, frequently gives considerable trouble in distribution due to the presence in the gas of minute particles of gummy or resinous material formed in the gas by reaction between small concentrations of oxides of nitrogen and a wide range of hydrocarbons. These particles when formed are invisible even with the aid of the ultra microscope. On aging of the gas, however, they increase in size, but are still very small when the gas reaches the appliances. The visible particles may range from the threshold of visibility of the ultra microscope up to a diameter of 1 micron above which size they tend to fall out of the gas.

In gas-burning appliances provided with burners consuming gas at a low rate, such as the pilot burners of gas ranges and water heaters and the low rate burners of refrigerators, the gas is passed through narrow constrictions to secure the desired low rate of flow. For instance, in a widely employed range pilot burner, the needle-valve, when adjusted for the usual pilot flow under the usual pressure conditions, has an annular opening averaging approximately .00028 inch in width.

The presence of the gum particles in the gas has caused very considerable trouble by effecting the stoppage of these and other small restriction, resulting in the frequent extinction of pilot flames and the sticking of automatic valves with consequent improper and sometimes dangerous functioning of the gas appliances.

The principal object of the present invention is the provision of a gas filter capable of removing efficiently such small particles as the above referred to gum particles without introducing too great a resistance to the flow of the gas.

The invention comprises the improvements to be presently described and finally claimed.

The invention will be described and its advantages pointed out in connection with the accompanying drawing which forms a part of this specification and which shows a form of the invention chosen for illustration, and in which:

Figure 1 shows the filter partly in section and partly in elevation;

Fig. 2 shows an end view of the apparatus of Fig. 1; and

Fig. 3 shows a section along the line 3—3 in Fig. 1.

Referring to the figures: 1 generally indicates the filter casing which is provided with the cover member 2 which may be attached to the casing in any convenient gas-tight manner as, for instance, by the bolts 3 which engage tapped holes 4 in a flange 5 on the casing.

The casing is provided with the tangential gas inlet 6, threaded to receive a pipe leading from the gas supply (not shown). 7 is the gas outlet provided on the cover 2 and threaded to receive a pipe leading to the burner or burners of the appliance (not shown).

8 indicates the gum-filtering element, a filter block in the form of a hollow cylinder of material having the proper interstitial dimensions to filter out the minute gum particles, and of such over-all dimensions as to pass the desired gas flow without exceeding the allowable pressure drop through the filter. We have found that fused alumina of uniform grain size is satisfactory over a range of porosities from approximately 6 to approximately 20. 6 and 20 are measures of porosity expressed as the number of cubic feet of dry air per minute per square foot of surface area that the material will pass with a pressure drop of 2 inches of water when tested at 70° F.

The filter element is assembled on the cover 2 by means of the bolt 9, washer 10, nut 11 and gaskets 12 and 13. An annular passage 14 is provided around the bolt communicating with passages 15 to provide communication between the bore of the filter cylinder and the outlet 7. The gaskets form gas-tight joints between the filter element and the washer 10, and between the filter element and the cover 2, and may be made of soft rubber.

The filter element 8 is surrounded by the coarse filter element 16, which is provided to filter out dust and dirt particles to prevent such particles from reaching the fine filter 8 and rapidly clogging it. The provision of the coarse filter element permits the confinement of the duty of the filter element 8 to the removal of the extremely small particles, such as the gum. We have found that sheet-woven asbestos is a satisfactory material for the coarse filter 16. The coarse filter may remove some of the larger gum particles, especially after its interstices have been partially blocked with larger particles of dust and dirt. The coarse filter element may be spaced slightly from the filter element 8, providing the space 17 which assist in distributing the flow of gas uniformly through the element 8.

The casing may be provided with an additional inlet opening 18 for use where space conditions make the use of the side inlet 6 inconvenient. The washer 10 may be provided with notches 19 for leading gas from the space 20 into the space 21, around the filtering elements, when the inlet 18 is employed. The plug 22 serves to close the opening 18 if the inlet 6 is employed.

In operation, assuming the side inlet 6 is employed, the gas passes through the tangential inlet into the space 21 around the filtering elements. The tangential inlet minimizes the impingement of the gas upon the surface of the filtering elements confronting the opening, and by distributing the gas around the periphery minimizes a tendency to concentrate the filtering duty unequally on the inlet side.

From the space 21 and gas passes through the asbestos filter 16, depositing the coarse particles, and thence through the fine filter 8 which filters out the fine particles such as the gum particles. The cleaned gas passes from the bore of cylinder 8 through the openings 14 and 15 to the gas outlet 7 and thence to the appliance burner (not shown). The arrangement providing passage of the gas from the outside to the inside of the cylinder is desirable, because of the greater surface area at the outside where the pressure is higher. In case the opening 18 is used as the inlet, the opening 6 is plugged, and the gas passes through inlet 18 into the space 20 which serves as a dust collection space; from space 20 the gas passes through the notches 19 in the washer 10, and thence into the space 21. From there on the gas travel is as before described.

We have found that, if the gas filtered has been aged two hours prior to filtering, the filter element 8, if made of material having a porosity of 20, is satisfactory for the removal of the gum particles. If the gas is younger on filtering, there is a tendency for some particles to pass through the filter and gradually form deposits in the appliance pilot controls. In such case, it is desirable to employ the material of lower porosities. After two hours, the particles have grown sufficiently to be be removed by the 20-porosity material.

The dimensions of the filter will depend upon the capacity of the attached burners, the permissible pressure drop through the filter, the porosity of the filter, and the desired length of time before the filter needs cleaning, as well as the character of the gas with respect to gum particles present.

The filter is easily assembled and may be readily taken apart for cleaning. The filter element 8 may be cleaned by removing it and exposing it to a gentle heating above the temperature at which the gums decompose to oxides of nitrogen and other gases but below that at which they carbonize. It is also possible to dissolve the gum out by appropriate solvents.

In actual use the filter, provided with an element of appropriate porosity with respect to the age of the gas, has supplied gas for weeks to a common type of needle-valve controlled range pilot without appreciable diminution of the pilot flame, while gas from the same storage caused the daily extinction of the same type of pilots adjusted for the same flow of gas, due to stoppage of the needle-valves by gum.

It will be obvious to those skilled in the art to which the invention relates that modifications may be made in details of procedure and matters of mere form without departing from the spirit of the invention, which is not limited to such matters or otherwise than the prior art and the appended claims may require.

We claim:

1. A filter for removing vapor phase gum from manufactured combustible gas comprising, a hollow porous cylinder adapted to remove gum and composed of fused alumina of uniform grain size and capable of passing from six to twenty cubic feet of dry air per minute per square foot of surface area with a pressure drop of two inches of water when tested at 70° F., a second cylinder adapted to remove dust and composed of woven sheet asbestos and arranged around the first cylinder, means for sealing the space inside said cylinders from the space outside thereof, and a casing enclosing said cylinders and having a gas inlet to the space outside of the cylinders, and a gas offtake from the space inside of said cylinders.

2. A filter for removing vapor phase gum from manufactured combustible gas comprising, a hollow porous cylinder adapted to remove gum and composed of fine filtering material and capable of passing from six to twenty cubic feet of dry air per minute per square foot of surface area with a pressure drop of two inches of water when tested at 70° F., a second cylinder adapted to remove dust and composed of coarse filtering material and arranged around the first cylinder, a casing having a removable cover and enclosing said cylinders, a bolt rod depending from the cover through the cylinders and having a washer carrying said cylinders, gaskets at the ends of the cylinders, means for introducing gas into the casing outside of said cylinders, and means for leading off gas from the inside of said cylinders including openings at the head of the bolt.

JOSEPH B. CLAFFEY.
JOSEPH A. PERRY.